US005678894A

United States Patent [19]

Eley

[11] Patent Number: 5,678,894

[45] Date of Patent: Oct. 21, 1997

[54] DENTAL CHAIR WITH HEADREST

[76] Inventor: Christopher D. Eley, 722 N. 13th St., Apt. #905, Milwaukee, Wis. 53233

[21] Appl. No.: 630,720

[22] Filed: Apr. 8, 1996

[51] Int. Cl.[6] .................... B60N 2/24

[52] U.S. Cl. .................... 297/354.13; 297/68; 297/78; 297/408; 297/900; 5/618; 5/638

[58] Field of Search .................... 297/354.13, 900, 297/392, 400, 408, 68, 69, 78; 5/618, 638, 725

[56] References Cited

U.S. PATENT DOCUMENTS

| | | | |
|---|---|---|---|
| D. 298,992 | 12/1988 | Voss | 5/638 X |
| 478,590 | 7/1892 | Gould | 297/68 |
| 1,814,877 | 7/1931 | Weber | 297/68 |
| 2,631,303 | 3/1953 | Valentine | 5/111 |
| 3,053,568 | 9/1962 | Miller | 297/78 |
| 3,140,497 | 7/1964 | Carswell | 5/338 |
| 3,156,500 | 11/1964 | Kerr . | |
| 3,315,282 | 4/1967 | Lowery et al. . | |
| 3,337,883 | 8/1967 | Allison | 5/638 |
| 3,414,324 | 12/1968 | Taylor et al. | 297/68 X |
| 3,427,072 | 2/1969 | Hale . | |
| 3,536,355 | 10/1970 | Osbeck | 297/78 X |
| 3,552,797 | 1/1971 | D'Houdain | 297/408 X |
| 3,609,779 | 10/1971 | Oja et al. . | |
| 3,698,765 | 10/1972 | Olsen | 297/396 |
| 3,729,227 | 4/1973 | Ohta | 297/391 |
| 3,817,576 | 6/1974 | Ciavattoni et al. | 297/408 |
| 3,874,010 | 4/1975 | Geary | 5/61 |
| 3,897,102 | 7/1975 | Lemaire | 297/191 |
| 3,936,091 | 2/1976 | Rabinowitz | 297/408 X |
| 3,946,452 | 3/1976 | Eary, Sr. | 5/327 |
| 4,014,594 | 3/1977 | Hain | 297/408 |
| 4,312,500 | 1/1982 | Jansen | 5/618 |
| 4,312,538 | 1/1982 | Kennedy et al. | 297/408 |
| 4,333,637 | 6/1982 | Shelton | 269/322 |
| 4,333,638 | 6/1982 | Gillotti | 269/322 |
| 4,335,920 | 6/1982 | Hirth | 297/408 |
| 4,353,595 | 10/1982 | Kaneko et al. | 297/408 |
| 4,415,203 | 11/1983 | Cawley | 297/391 |
| 4,492,407 | 1/1985 | Broadhead | 297/78 |
| 4,557,471 | 12/1985 | Pazzini | 5/618 |
| 4,582,311 | 4/1986 | Steffensmeier | 269/325 |
| 4,606,086 | 8/1986 | Rowland | 297/900 X |
| 4,699,423 | 10/1987 | Fitzig et al. | 297/245 |
| 4,710,991 | 12/1987 | Wilmore et al. | 5/638 |
| 4,746,167 | 5/1988 | Palmer et al. | 297/423 |
| 4,779,297 | 10/1988 | Sturges | 5/638 X |
| 4,823,776 | 4/1989 | Foster et al. | 128/33 |
| 4,858,260 | 8/1989 | Failor et al. | 5/618 |
| 4,943,117 | 7/1990 | Brown | 297/392 |
| 5,086,769 | 2/1992 | Vianello et al. | 297/68 X |
| 5,177,823 | 1/1993 | Riach | 5/636 |
| 5,222,779 | 6/1993 | Johnson | 297/900 X |

(List continued on next page.)

FOREIGN PATENT DOCUMENTS

| | | | |
|---|---|---|---|
| 1061219 | 8/1979 | Canada . | |
| 553787 | 5/1923 | France . | |
| 2444458 | of 1980 | France . | |
| 1941603 | 3/1978 | Germany | 5/638 |
| 3445846 | of 1986 | Germany . | |
| 3628325 | 2/1988 | Germany | 5/638 |
| 61-62488 | of 1986 | Japan . | |
| 118262 | of 1958 | U.S.S.R. . | |
| 1031814 | 8/1966 | United Kingdom . | |
| 2129290 | 5/1984 | United Kingdom . | |

*Primary Examiner*—Peter M. Cuomo
*Assistant Examiner*—Rodney B. White
*Attorney, Agent, or Firm*—Nilles & Nilles

[57] ABSTRACT

Systems and methods for positioning the oral cavity of a dental patient are described. An apparatus, includes: a pivotable chair including: a reclinable back; and a headrest connected to the reclinable back, the headrest including: a bracket for attaching the headrest to the reclinable back; and a pad connected to the bracket, the pad including an internal perimeter that defines a hole through which a prone patient's nose and mouth can protrude so that the prone patient's oral cavity can be reached from below the prone patient. The systems and methods provide advantages in that back and neck stress on the dentist is reduced while dental prophylaxis is facilitated.

15 Claims, 6 Drawing Sheets

U.S. PATENT DOCUMENTS

| | | | |
|---|---|---|---|
| 5,233,713 | 8/1993 | Murphy et al. | 5/636 |
| 5,267,778 | 12/1993 | Krebs et al. | 297/330 |
| 5,269,035 | 12/1993 | Hartunign | 5/638 |
| 5,297,850 | 3/1994 | Guleserian | 297/900 X |
| 5,342,114 | 8/1994 | Burke et al. | 297/354.13 |
| 5,427,436 | 6/1995 | Lloyd | 297/408 |
| 5,444,882 | 8/1995 | Andrews et al. | 5/618 |
| 5,546,619 | 8/1996 | Braun | 5/638 |

Fig.7A
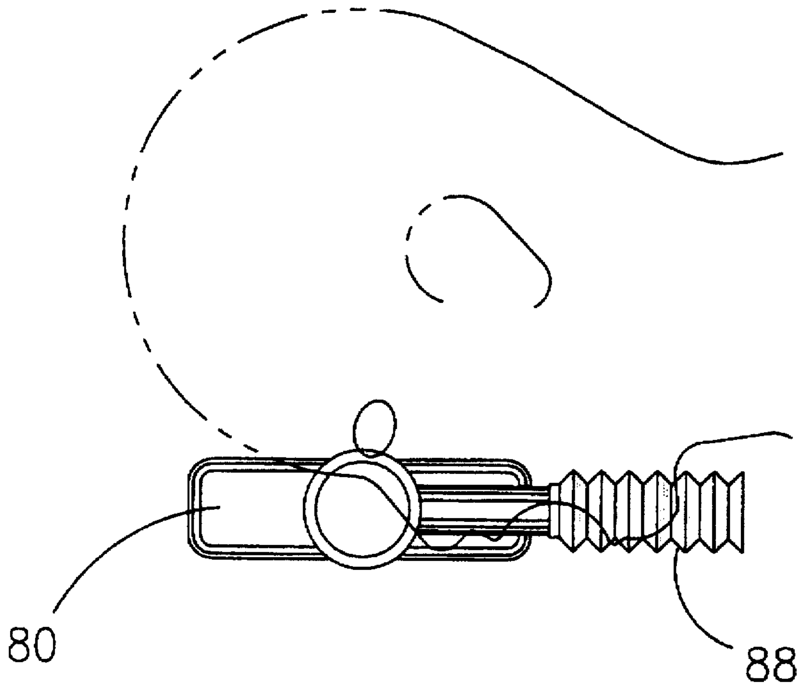
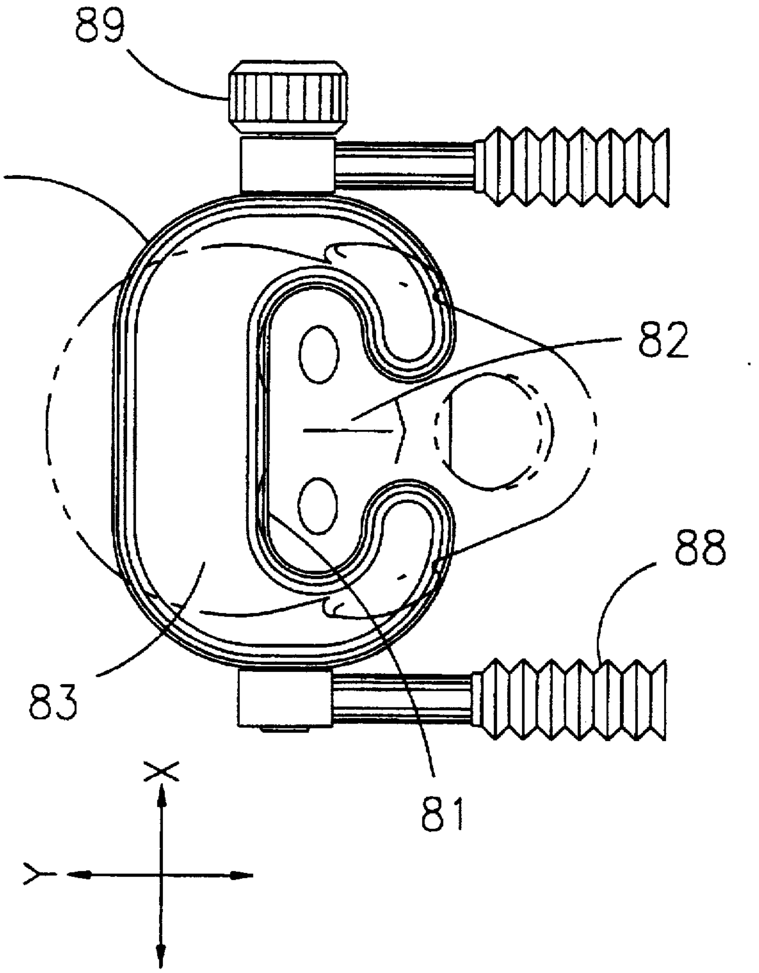
Fig.7B

DENTAL CHAIR WITH HEADREST

BACKGROUND OF THE INVENTION

1. Field of the Invention

The present invention relates in general to the field of dentistry. More particularly, the present invention relates to a dental chair headrest and a dental chair that includes the headrest. Specifically, a preferred embodiment of the present invention relates to a dental chair that can be folded flat and which includes a headrest defining a void through which a prone patient's nose and mouth can protrude and be reached from below by the dentist. The present invention thus relates to dental apparatus and methods of the type that can be termed prone.

2. Discussion of the Related Art

Within this application several publications are referenced by arabic numerals within parentheses. Full citations for these, and other, publications may be found at the end of the specification immediately preceding the claims. The disclosures of all these publications in their entireties are hereby expressly incorporated by reference into the present application for the purposes of indicating the background of the present invention and illustrating the state of the art.

Historically, it has been known in the field of odontology to seat a patient in a chair designed to facilitate dental treatment. Prior art dental chairs of the type hereunder consideration, sometimes called examination chairs, are well-known to those skilled in the art. A conventional dental chair is typically used to facilitate dental prophylaxis. For example, a patient will typically be reclined in a conventional seated posture and a dentist will sit to one side, and behind, the patient.

However, with regard to this conventional seated posture, the dentist is required to lean over the patient's oral cavity in order to provide treatment.(1,2) This approach has been ergonomically inefficient because stress is induced in the neck and back of the dentist. The more time spent by the dentist leaning over the patient's oral cavity, the greater is the stress on the neck and back. If a long period of time is required to perform a procedure, or if more than just a few patient's are to be treated during the day, the stress on the neck and back can accumulate to a level that is uncomfortable for the dentist. This can result in fatigue, thereby possibly lowering the quality of treatment provided by the dentist. In a severe case, the fatigue can accumulate to a level that cannot be tolerated by the dentist. Thus, a previously recognized problem has been that leaning over the patient results in neck and back stress being incurred by the dentist leading to decreased efficiency. Needless to say, it is desirable to provide an arrangement having higher efficiency. What is needed therefore is an apparatus and method that efficiently positions a patient for more efficient dental treatment.

One prior art approach, in an attempt to solve the fatigue problem referred to above, involves stopping treatment to permit the dentist to take a break. However, providing dental treatment is a competitive business. A preferred solution will be seen by the end-user as being cost effective. Therefore, what is also needed is an apparatus and method that efficiently positions a patient and is cost effective. A solution is cost effective when it is seen by the end-user as compelling when compared with other potential uses that the end-user could make of limited resources.

Another previously recognized problem has been that debris created by dental treatment can fall down a patient's throat. Such events can more likely happen during certain procedures such as, for example, upper fillings and root canals. Therefore, what is also needed is an apparatus and method that helps to prevent debris entering a patient's throat.

One prior art approach, in an attempt to solve the debris problem referred to above, involves providing a vacuum nozzle within the patient's oral cavity. However, a disadvantage of this previously recognized approach is that not all debris is gathered by such a vacuum nozzle. Another disadvantage of this previously recognized approach is the vacuum nozzle can become obstructed by a solid object, such as the tissue of the patient's gum or inner cheek.

Another previously recognized problem has been that the effect of local anesthetics appears to be, at least in part, a function of the ambient gravitational field, as evidenced by spatially resolved differential block.(3,4) Therefore, what is also needed is an apparatus and method that will permit the dentist to more fully adjust the patient's posture with regard to the gravitational field. Heretofore the above-discussed requirements have not been fully met.

The below-referenced patents disclose embodiments that were at least in-part satisfactory for the purposes for which they were intended. The disclosures of all the below-referenced prior United States patents in their entireties are hereby expressly incorporated by reference into the present application for purposes including, but not limited to, indicating the background of the present invention and illustrating the state of the art.

U.S. Pat. No. 5,233,713 discloses a head holder for nuclear imaging. U.S. Pat. No. 5,177,823 discloses an adjustable headrest. U.S. Pat. No. 4,823,776 discloses an adjustable head support. U.S. Pat. No. 4,333,638 discloses a massage table having a removable headrest. U.S. Pat. No. 3,897,102 discloses a chair with a face hole that is adjustable to a flat configuration. U.S. Pat. No. 2,631,303 discloses a portable folding cot with a face hole. Canadian Patent 1,061,219 discloses a head support. French Patent 553.787 discloses a surgical table having a head rest with a hole.

SUMMARY AND OBJECTS OF THE INVENTION

By way of summary, the present invention, hereinafter termed the God-Speed, is directed to a dental headrest, a chair that includes said dental headrest and methods of use thereof. An effect of the God-Speed is to facilitate a dentist's access to a patient's oral cavity.

A primary object of the God-Speed is to provide an apparatus that facilitates dental prophylaxis. Another object of the God-Speed is to provide an apparatus that is cost effective. It is another object of the God-Speed is to provide an apparatus that is rugged and reliable, thereby decreasing down time and operating costs. It is yet another object of the God-Speed is to provide an apparatus that has one or more of the characteristics discussed above but which is relatively simple to manufacture and assemble using a minimum of equipment.

In accordance with a first aspect of the God-Speed, these objects are achieved by providing an apparatus comprising a pivotable chair including: a reclinable back; and a headrest connected to said reclinable back, said headrest including: a bracket for attaching said headrest to said reclinable back; and a pad connected to said bracket, said pad including an internal perimeter that defines a hole through which a prone patient's nose and mouth can protrude so that said prone patient's oral cavity can be reached from below said prone patient. In one embodiment, the pivotable chair includes a base portion connected to said reclinable back and an elevating mechanism connected to said base portion.

Another object of the God-Speed is to provide a method that can be used to treat dental patients. It is another object of the God-Speed is to provide a method that is predictable and reproducible, thereby decreasing variance and operating costs. It is yet another object of the God-Speed is to provide a method that has one or more of the characteristics discussed above but which is relatively simple to setup and operate.

In accordance with a second aspect of the God-Speed, these objects are achieved by providing a method of treating a dental patient, comprising: providing: a pivotable chair; locating the dental patient on the pivotable chair in a prone position so that the dental patient's nose and mouth protrude through a hole in a headrest; pivoting the pivotable chair; and reaching into the patient's oral cavity from below the patient. In a preferred embodiment, providing said pivotable chair includes providing said pivotable chair with a base portion connected to a reclinable back and an elevating mechanism connected to said base portion, and, further comprising elevating said pivotable chair.

These, and other, aspects and objects of the God-Speed will be better appreciated and understood when considered in conjunction with the following description and the accompanying drawings. It should be understood, however, that the following description, while indicating preferred embodiments of the God-Speed, is given by way of illustration and not of limitation. Many changes and modifications may be made within the scope of the God-Speed without departing from the spirit thereof, and the God-Speed includes all such modifications.

BRIEF DESCRIPTION OF THE DRAWINGS

A clear conception of the advantages and features constituting the God-Speed, and of the construction and operation of typical mechanisms provided with the God-Speed, will become more readily apparent by referring to the exemplary, and therefore nonlimiting, embodiments illustrated in the drawings accompanying and forming a part of this specification, wherein like reference numerals designate the same elements in the several views, and in which:

FIG. 7A illustrates a elevational view of a third embodiment of a headrest according to the God-Speed; and FIG. 7B illustrates a bottom plan view of the headrest depicted in FIG. 7A.

DESCRIPTION OF PREFERRED EMBODIMENTS

The God-Speed and the various features and advantageous details thereof are explained more fully with reference to the nonlimiting embodiments described in detail in the following description.

1. System Overview

The above-mentioned requirements are mutually contradicting and cannot be satisfied simultaneously in the case of a conventional examination chair. However, it is rendered possible to simultaneously satisfy these requirements to a certain extent by employing a headrest with a pad that defines a hole in consideration of the fact that the headrest is connected to a reclining back of a pivotable chair that can be adjusted into a substantially flat configuration before being pivoted.

2. Detailed Description of Preferred Embodiments

Figure 1:
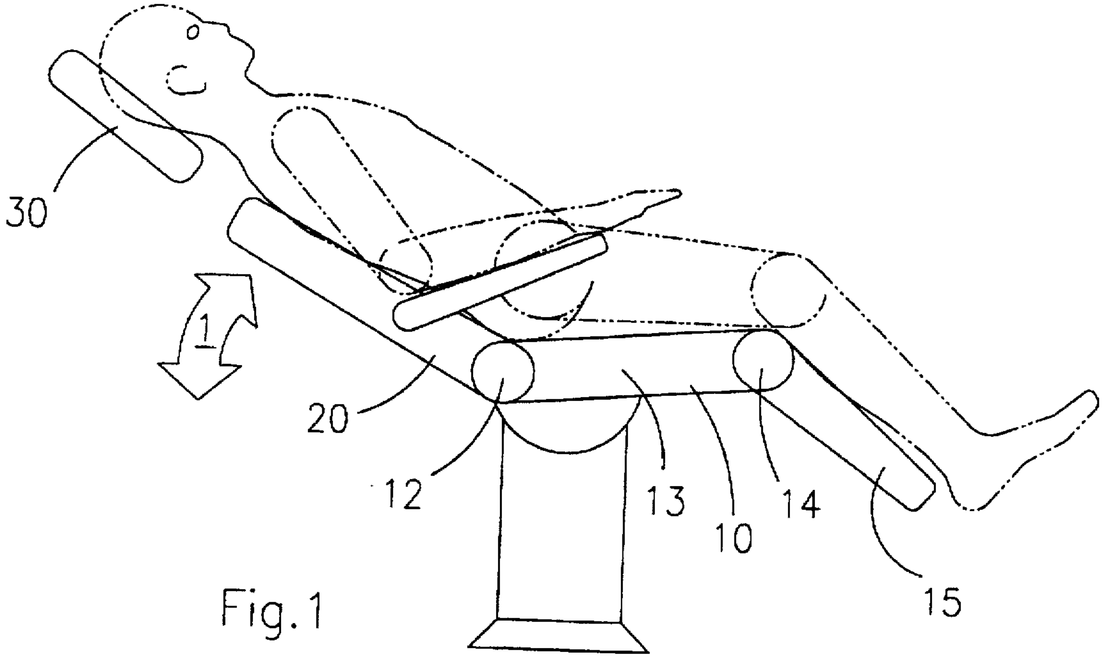
FIG. 1 illustrates an elevational view of a chair according to the God-Speed in a reclined position.

Referring to FIG. 1, the God-Speed relates to a pivotable chair 10 with a reclinable back 20 and a headrest 30. Reclinable back 20 can be pivoted as represented by arrow 1. (It should be noted that the pivotable chair is represented in FIG. 1 as having a first hinge 12 between the reclinable back 20 and base portion 13 and a second hinge 14 between base portion 13 and leg rest 15 for improved clarity.) Although the preferred embodiment shown in FIG. 2 includes first hinge 12 and second hinge 14, it is within the level of ordinary skill in the art after having knowledge of the God-Speed to provide any type of pivotable chair having any number of hinges and/or any number of body supporting portions.

Figure 2:
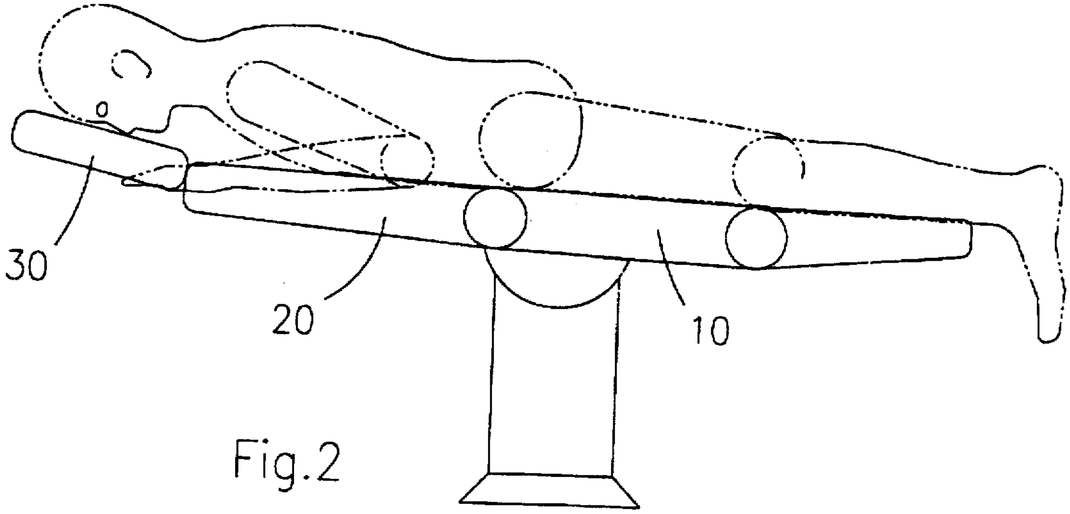
FIG. 2 illustrates an elevational view of a chair according to the God-Speed in a flat position.

Referring now to FIG. 2, pivotable chair 10 equipped with head rest 30 should be adjustable into a substantially flat configuration. In this configuration, the patient lies flat on their stomach; with their face down and against the headrest. The hole in the headrest (not shown in FIG. 2) allows the patient's nose and mouth to protrude and be reached from below. The hole is large enough that the patient can both breath freely and fully extend their jaw. The hole encircles the patient's face and is narrower near the bridge of the nose than near the jaw.

Figure 3:
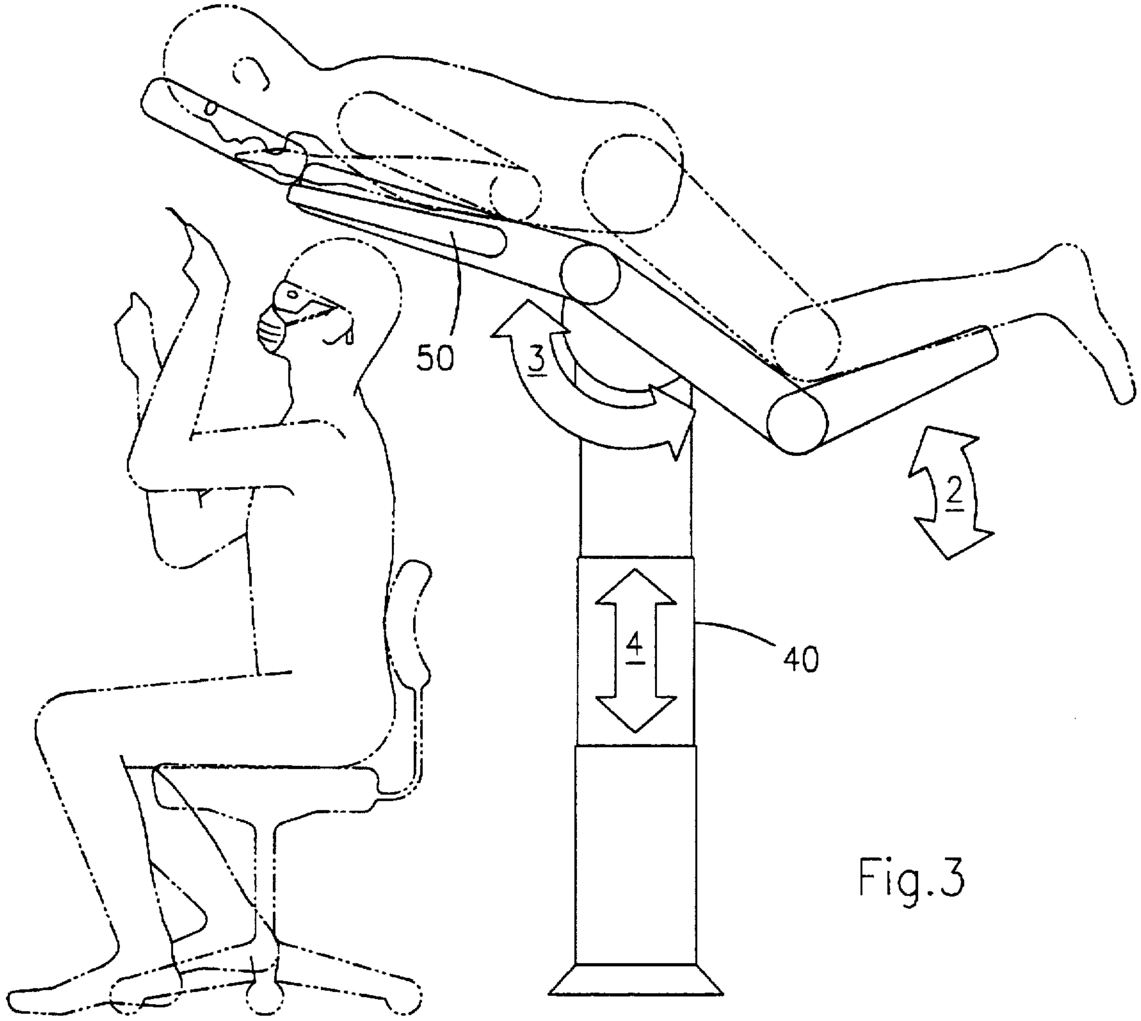
FIG. 3 illustrates an elevational view of the chair depicted in FIG. 1 in a cambered, elevated and inclined position.

Referring now to FIG. 3, while in the flat configuration, the leg rest 15 can be pivoted as represented by arrow 2. Further, the entire plane of the chair can be pivoted (tilted) as represented by arrow 3. This important feature of the chair permits the flat plane defined by the chair, and hence the patient's oral cavity, to be set at a variable angle by the dentist. The God-Speed provides the unexpected advantageous result that the dentist (I) can work on the patient from below at a variety of angles, thereby reducing neck and back stress, and (II) does not need to hold a mirror to view the upper half of the oral cavity, thereby freeing one hand for other manipulative activities.

In addition, it is preferred that pivotable chair 10 be provided with an elevating mechanism 40 so that the entire variable angle plane of the chair is vertically adjustable as represented by arrow 4. This important feature of the chair permits the dentist to vary the relative height of the patient without adjusting the height of his own chair.

As noted above, the God-Speed provides the unexpected advantageous result that the dentist can work on the patient from below at a variety of relative heights, thereby reducing neck and back stress. Another unexpected advantageous result provided by the God-Speed is that eye strain incurred by the practitioner is reduced and the practitioner can work more quickly and effectively.

Further, due to the position of the patient, their face is well protected. In addition, every part of the patient's body below the chin is protected.

The pivotable chair 10 can be provided with an arm rest 50 at each side thereof. Armrest 50 is attached to the back of the chair with a hinge pin (not shown) so as to swing from a chair configuration, through a bed configuration, to a "below-point-blank" configuration wherein the arms of the patient are supported in a position that is below the plane of the chair when the chair is in the substantially flat configuration.

Figure 4:
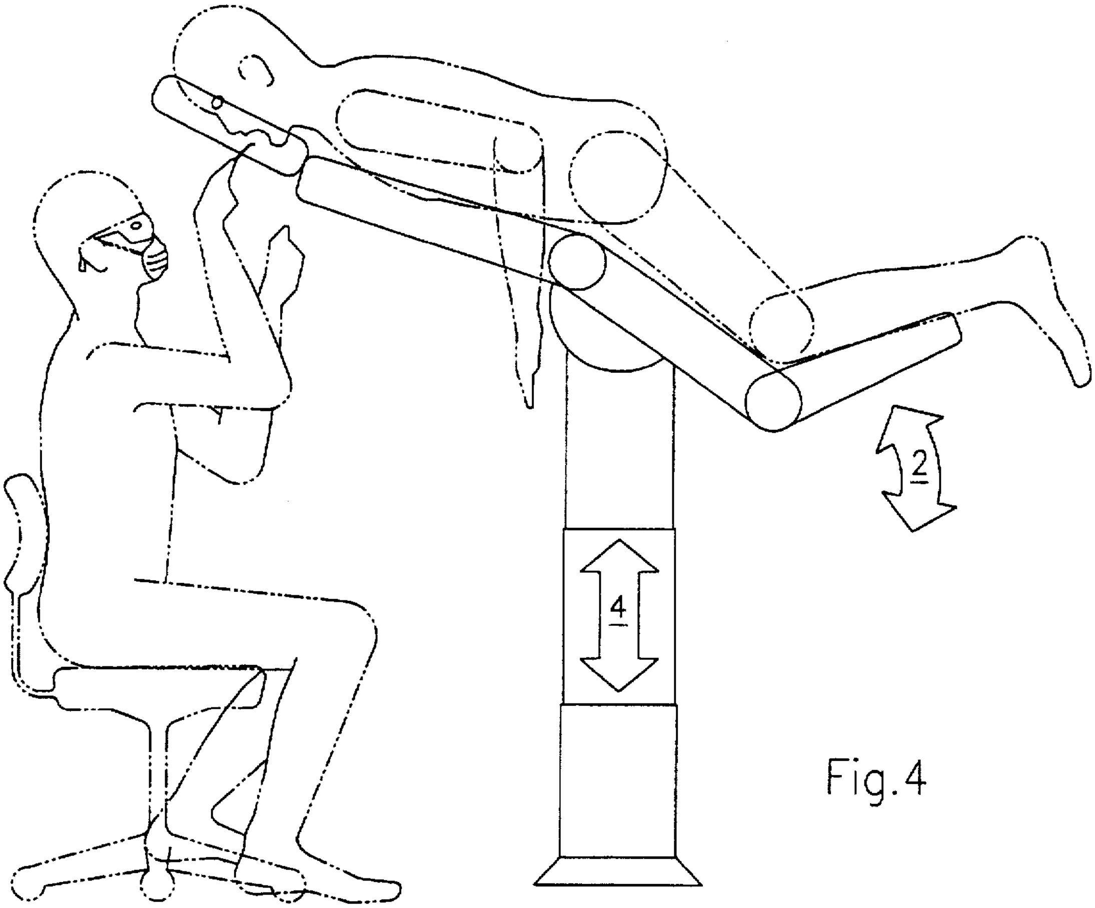
FIG. 4 illustrates an elevational view of the chair depicted in FIG. 2 in a cambered, elevated and inclined position.

Referring now to FIG. 4, it will be appreciated that the dentist can be positioned in any posture with regard to the oral cavity of the patient. In this embodiment the pivotable chair does not include any armrests.

The God-Speed provides the unexpected advantageous result that the chance of the patient swallowing an amalgam, a crown, or endodontic filings, etc. is decreased. Further, the God-Speed is particularly advantageous for use with disabled patients who find it difficult, or impossible, to hold their head and neck in one position, possibly due to lack of head and neck muscle control.

Furthermore, the God-Speed is an unexpectedly excellent tool for endodontics because there is no need for a rubber dam. Further, an endodontist can perform a root canal on the second or third molars faster and with greater accuracy via direct vision.

Moreover, the God-Speed provides the unexpected result that during the making of impressions, due to the position of the head and neck, the patient does not feel as if he or she is swallowing on choking on the impression material. This aspect of the God-Speed is unexpectedly good for facilitating treatment of "gagging" patients.

One minor possible disadvantage is that the prone position might not be good for a pregnant woman because use of the chair requires the patient to rest on their stomach. One possible way to obviate this disadvantage would be to provide blocking cushions around a portion of the base section of the chair so as to transfer the compressive force toward the chest and upper legs of such a patient. Another possible way to obviate this disadvantage would be to pivot the chair to a certain extent before the patient lies face down on the chair.

Referring now to FIGS. 5A–5B, 6A–6B and 7A–7B, the headrest itself, should be in a shape that will distribute weight across a relatively large area of the patient's face while leaving the oral cavity of the patient accessible. The hole defined by the inner perimeter of the hole in the head rest can be any shape that provides the function of permitting the dentist access to the oral cavity of the patient.

Figure 5A:
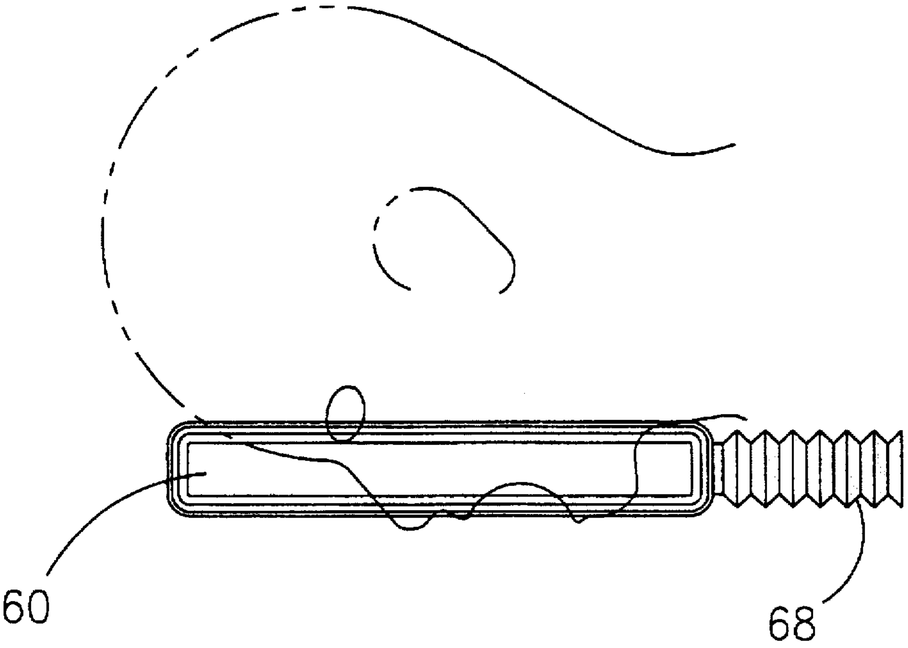
FIG. 5A illustrates a elevational view of a first embodiment of a headrest according to the God-Speed.
Figure 5B:
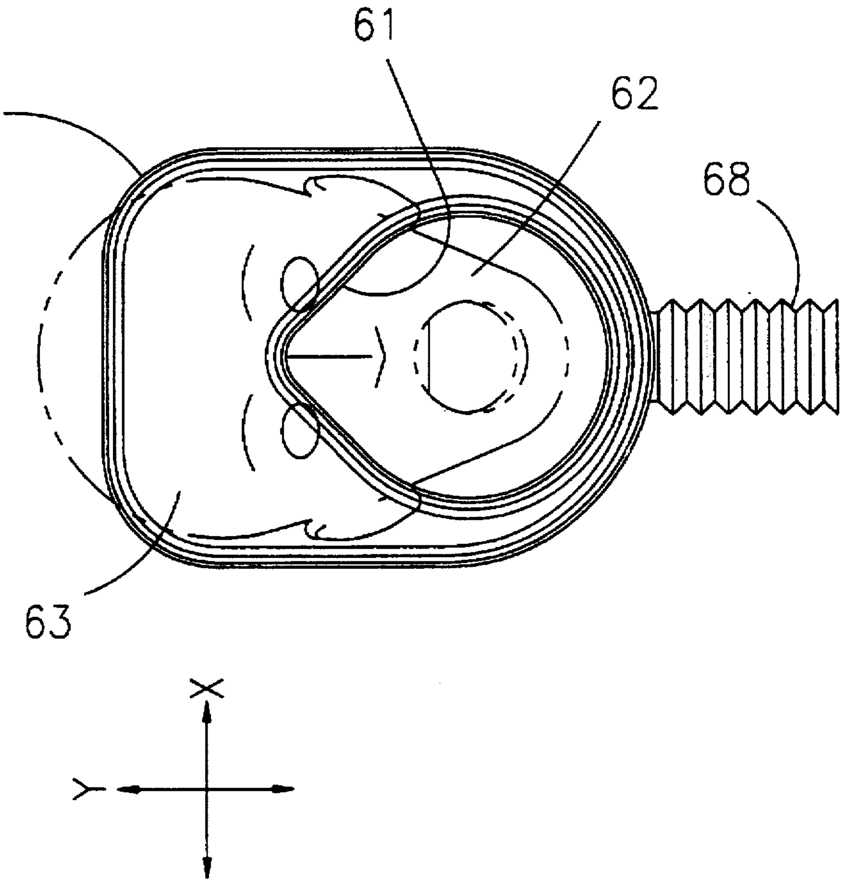
FIG. 5B illustrates a bottom plan view of the headrest depicted in FIG. 5A.

Referring to FIGS. 5A–5B, an example of the God-Speed is shown. Headrest 60 includes bracket 68 for attaching headrest 60 to a reclining back. Headrest 60 includes a pad 63 that includes an inner perimeter 61 that defines a hole 62 through which a prone patient's nose and mouth can protrude. Hole 62 can be characterized as having the shape of a teardrop. The apex tip of the teardrop roughly conforms to the shape of the bridge of the nose. The bottom of the teardrop defines a radius of curvature that roughly conforms to the shape of the junction between the jowl and the neck.

The shape of the hole in the headrest that is defined by the internal perimeter can be described by one or more geometric equations. As is well known, the standard form of the equation of a circle is:

$$(x-h)^2+(y-k)^2=(r'')^2 \qquad (1)$$

where x and y are orthogonal coordinates, h and k are constants and r" is the radius of the circle.

Consider the example of a headrest that has an internal perimeter that defines a single circular hole, (i.e., one circular section). Assuming the center of the circular hole is centered at the origin of an arbitrary coordinate system, the values of h and k are zero and Equation (1) reduces to Equation (2). Thus, in the case of a single circular hole, equation (2) alone could represent the entire inner perimeter.

$$(x)^2+(y)^2=(r')^2 \qquad (2)$$

where x and y are orthogonal coordinates and r' is the radius of the circle.

Consider the slightly more complicated example of an internal perimeter that defines an elongated circular hole, (i.e., two separated circular sections). Such an elongated circular hole can be defined by a series of four equations. Equation (2) would represent one end of the hole, two linear equations would represent the straight sides of the hole and Equation (1) would represent the other end of the hole, where h and k in Equation (1) would represent the lateral and vertical distances between the centers of the two circular equations, respectively.

Consider the more complicated example of an internal perimeter that defines a hole that includes at least one parabolic section. As is well known, the standard form of the equation of a parabola is given by Equation (3), where the vertex of the parabola is located at the origin of the coordinate system.

$$y^2=4cx \qquad (3)$$

where x and y are orthogonal coordinates and c is a constant.

Referring now to FIG. 5B, a specific example of a hole that includes a circular section and a parabolic section will now be considered. Hole 61 can be defined by a series of four equations. Assuming that a first center is i) located at the center of the bottom circular section of the hole and ii) located at the origin of an arbitrary coordinate system, h and k in general Equation (1) would both be zero, and the circular portion of the perimeter of the hole that surrounds the junction between the jowl and the neck could be represented by Equation (2). As was the case with the elongated circle example above, two linear equations of the form y=mx+b can represent the straight sides of hole 61. The portion of the hole 61 that surrounds the bridge of the nose in parabolic in shape. To represent the portion of the perimeter of the hole 61 that surrounds the bridge of the nose requires modifying Equation (3) in two ways. Assuming that a second center is located at the vertex of the upper parabolic section of the hole, Equation (3) must first be modified to the form of Equation (4) because the parabola defined by the perimeter of the hole that surrounds the bridge of the nose points downward with respect to the coordinate system depicted in FIG. 5B.

$$x^2=-4cy \qquad (4)$$

where x and y are orthogonal coordinates and c is a constant.

Equation (4) must then be modified to the form of Equation (5) because of the change in position from the bottom center to the top center, (i.e., coordinate translation).

$$(x)^2=-4c(y+k) \qquad (5)$$

where x and y are orthogonal coordinates, c is a constant and k is the vertical distance between the two centers along the y axis (a positive value in the case of FIG. 5B).

Thus, portions of the perimeter of a roughly teardrop shaped hole can be expressed by Equations (2), (5) and two equations of the form y=mx+b. It is preferred that constant c has a relative value of 1, 2, 3, 4, or 5, while the constant r has a relative value of 4, 5, 6, 7, 8, 9 or 10.

Figure 6A:
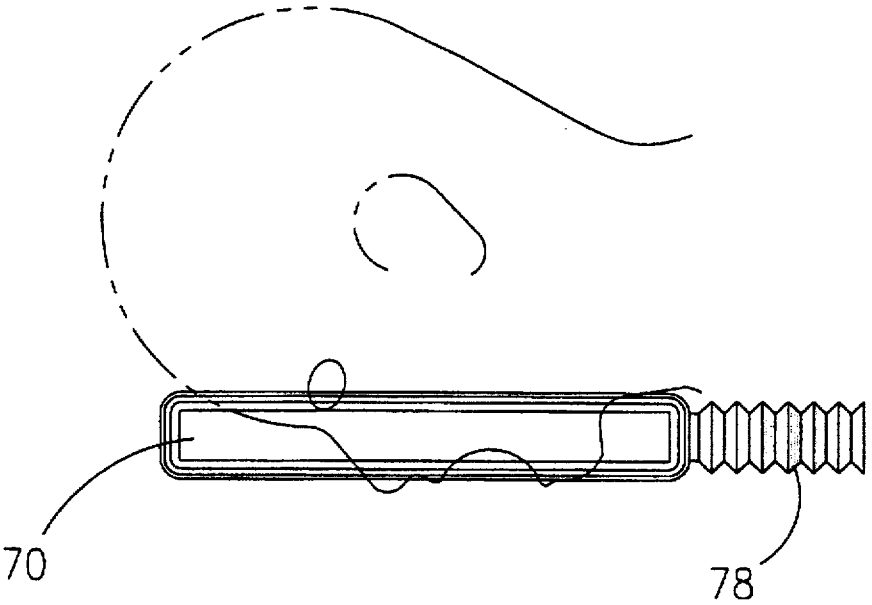
FIG. 6A illustrates a elevational view of a second embodiment of a headrest according to the God-Speed.
Figure 6B:
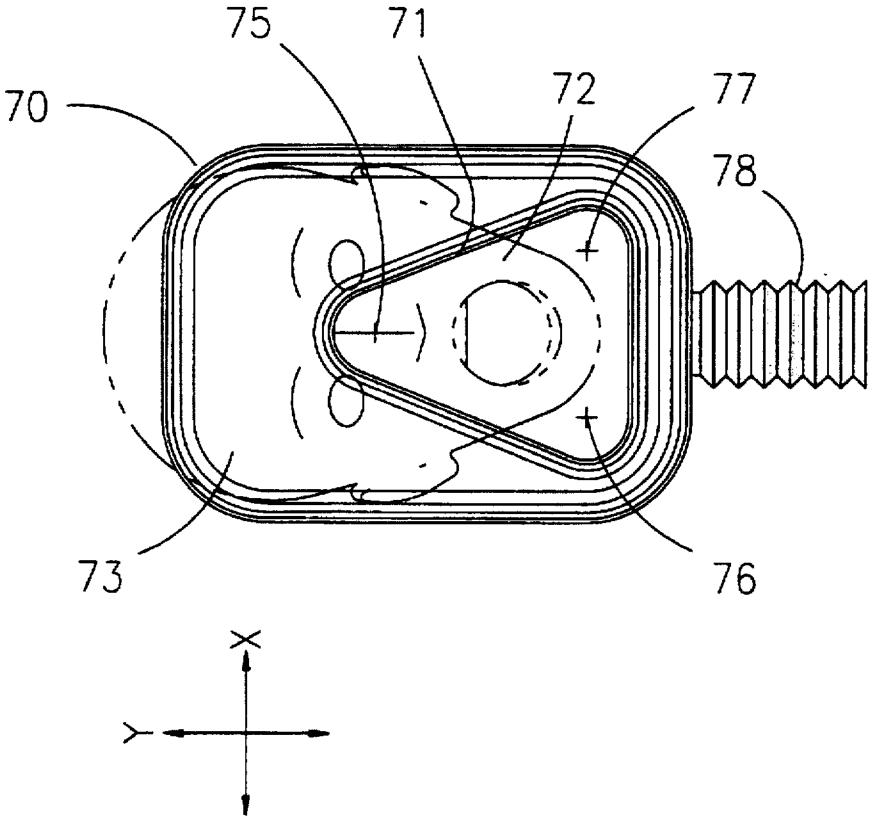
FIG. 6B illustrates a bottom plan view of the headrest depicted in FIG. 6A.

Referring now to FIGS. 6A–6B, another example of the God-Speed is shown. Headrest 70 includes bracket 78 for attaching headrest 70 to a reclinable back. Headrest 70 includes a pad 73 that includes an inner perimeter 71 that defines a hole 72 through which a prone patient's nose and mouth can protrude. Hole 72 can be characterized as having the shape of a triangle, albeit with three circularly rounded radii. The apex tip of the triangle roughly conforms to the shape of the bridge of the nose. The bottom of the triangle defines a composite radius of curvature that roughly conforms to the shape of the junction between the jowl and the neck.

The generally triangular shaped hole 72 includes three circular subsections can be defined by a series of six equations. Three of these six equations are linear equations, of the form y=mx+b, representing the three straight sides of such a generally triangular shaped hole. The other three of the six equations represent the three circular subsections. Of course, each of these three circle sections is located at one of three separate and distinct centers.

Referring to FIG. 6B, three separate and distinct centers are shown by the intersection of perpendicular construction lines. The location of first center 75 is near the upper narrow portion of the hole in the headrest that surrounds the bridge of the nose and abuts against the forehead of a patient. The locations of the second center 76 and the third center 77 are near the lower wider portion of the hole in the headrest which surrounds the jaw and may abut against the jowls of a patient.

Assuming that first center 75 is located I) at the origin of an arbitrary coordinate system and II) at the center of the circular section at the top of the hole 71, the portion of the perimeter of the hole that surrounds bridge of the nose of the patient can be represented by Equation (2). As noted above, three linear equations of the form y=mx+b can represent the straight sides of hole 71.

Still referring to FIG. 6B, and assuming that the second center 76 is located near the lower left of the illustration of the hole, Equation (1) represents the portion of the perimeter of the hole that surrounds the right side of the patient's jaw (lower left of the illustration of the hole) because the coordinate transformation from the top of the hole to the lower left involves negative scaler displacements along both the x and y axes. Accordingly, the third center 77 is located near the lower right of the illustration of the hole and Equation (6) represents the portion of the perimeter of the hole that surrounds the left side of the patient's jaw (lower right of the illustration of the hole) because the coordinate transformation from the top of the hole to the lower right involves a negative scaler displacement along the y axis and a positive scaler displacement along the x axis.

$$(x+h)^2+(y-k)^2=(r'')^2 \qquad (6)$$

where x and y are orthogonal coordinates, h and k are constants and r" is the radius of the circle.

Thus, portions of the perimeter of a roughly triangular shaped hole can be expressed by any combination of one or more of Equations (1), (2) and (6) and three equations of the form y=mx+b. It is preferred that the various r, r' and r" have relative values of 1, 2, 3, 4, or 5, while the constants h and k have relative values of 1, 2, 3, 4, or 5, and 2, 3, 4, 5 or 6, respectively.

Moreover, a generally triangular shaped hole that includes three parabolic subsections can be defined by an analogous series of six equations. Again, three of these six equations could be linear equations representing three straight sides of such a generally triangular shaped hole. The other three of the six equations represent the three parabolic subsections.

More specifically, rather than locating circular perimeter sections, the three centers depicted in FIG. 6B could be used to locate parabolic perimeter sections. Of course, this parabolic variation from what is depicted in FIG. 6B would result in a headrest that would appear different from that which is depicted in FIG. 6B. However, it will be appreciated that visual reference may continue to be made to FIG. 6B while a consideration of the following description of parabolic perimeter sections proceeds, for the sake of clarity. Assuming the first center is i) located at the vertex of the parabolic section located at the upper narrow portion of the hole and ii) located at the origin of an arbitrary coordinate system, Equation (4) can be used to represent the first parabolic section. Assuming the second center is located at the center of the lower left portion of the hole, Equation (4) must first be modified to the form of Equation (7) because of the change in direction of the parabola and the change in position from the top center to the lower left, (i.e., coordinate translation).

$$(x-h)^2=4c(y-k) \qquad (7)$$

where x and y are orthogonal coordinates, c is a constant, h=is the lateral distance between the two centers along the x axis (a negative value in the case of FIG. 6B) and k is the vertical distance between the two centers along the y axis (a negative value in the case of FIG. 6B).

Assuming the third center is located at the center of the lower right portion of the hole, translating the top center to the lower right yields Equation (8).

$$(x+h)^2=4c(y-k) \qquad (8)$$

where x and y are orthogonal coordinates, c is a constant, h=is the lateral distance between the two centers along the x axis (a positive value in the case of FIG. 6B) and k is the vertical distance between the two centers along the y axis (a negative value in the case of FIG. 6B).

Now, rotation of the coordinate system to account for the fact that the shape of the hole is symmetrically triangular requires modification of Equation (7) to Equation (9).

$$\{[x\cos(-\theta)+y\sin(-\theta)]-h\}^2=4c\{[-x\sin(-\theta)+y\cos(-\theta)]-k\} \qquad (9)$$

where x and y are orthogonal coordinates, c is a constant, θ is any angle (negative in the case of FIG. 6B), h=is the lateral distance between the two centers along the x axis k is the vertical distance between the two centers along the y axis.

Similarly, rotation of the coordinate system requires modification of Equation (8) to Equation (10).

$$\{[x\cos(\theta)+y\sin(\theta)]+h\}^2=4c\{[-x\sin(\theta)+y\cos(\theta)]-k\} \qquad (10)$$

where x and y are orthogonal coordinates, c is a constant, θ is any angle (positive in the case of FIG. 6B), h=is the lateral distance between the two centers along the x axis k is the vertical distance between the two centers along the y axis.

Thus, portions of the perimeter of a roughly triangular hole that are parabolic in nature can be expressed by any combination of one or more of Equations (4), (9) and (10) where θ is any angle. It is preferred that various constants c have relative values of 1, 2, 3, 4, 5, 6 or 7, while h and k have relative values of 1, 2, 3, 4, or 5, and 2, 3, 4, 5 or 6, respectively.

Referring now to FIGS. 7A–7B, another example of the God-Speed is shown. Headrest 80 includes bracket 88 for attaching headrest 80 to a reclinable back. Bracket 88 can include an angular adjustment mechanism 89. Headrest 80 includes a pad 83 that includes an inner perimeter 81 that defines a void 82 through which a prone patient's nose and mouth can protrude. A portion of void 82 beneath the eyes and nose of the patient can be characterized as having the shape of a "T". Headrest 80 has a shape that can be characterized as a boxer's face pad. The "C" shape of the face pad roughly conforms to the shape of the forehead and cheeks around the eyes.

The inner perimeter 81 can include a first section that varies substantially according to $$(x)^2+(y)^2=r^2;$$

a second section connected to said first section, said second section varying substantially according to $$(x)^2+(y+k)^2=(r')^2;$$

a third section connected to said second section, said third section varying substantially according to y=b;

a fourth section connected to said third section, said fourth section varying substantially according to $$(x+h)^2+(y+k)^2=(r'')^2; \text{ and}$$

a fifth section connected to said fourth section, said fifth section varying substantially according to $$(x+h)^2+(y)^2=(r''')^2.$$

It is preferred that the various constants r, r', r" and r'" have relative values of 1, 2, 3, 4, 5 or 6, while the constant b has a relative value of 1, 2, 3, 4 or 5.

Of course, the shape of the hole in the headrest is not limited to linear, circular and parabolic. The shape of the hole in the headrest can include any type of section, such as, for example, parametric, hyperbolic or complex, or any combination thereof. Similar equations can be used to define such sections.

In a more complex embodiment, the shape of the inner perimeter can be adjustable to accommodate different size/shape patients. For example, the length of the hole can be increased or decreased to accommodate various size patients having different nose to chin face lengths. As another example, the width of the hole can be increased or decreased so as to accommodate patients with different cheek-to-cheek and jaw widths. This adjustment could be made with interchangeable headrest parts. Alternatively, this adjustment could be made with a variable shape headrest.

Conveniently, the headrest of the God-Speed can be made of any soft yet supportive material. For the manufacturing operation, it is moreover an advantage to employ a urethane padded vinyl covered material.

The disclosed embodiments show a generally planar structure as the structure for performing the function of supporting the head of the patient. However, the structure for supporting the head of the patient can be any other structure capable of performing the function of a headrest, including, by way of example a helmet, a mask, or even a harness, in the case of a veterinary patient.

While not being limited to any particular theory, it is believed that the prone position of a dental patient will result in improved anesthesiology. This relationship may be due to preferential intercellular diffusion as a function of the gravitational vector.

While not being limited to any particular diagnostic identifier, preferred embodiments of the God-Speed can be identified one at a time by testing for the presence of patient comfort. The test for the presence of patient comfort can be carried out without undue experimentation by the use of the simple and conventional blood pressure and circulation experiments. Among the other ways in which to seek embodiments having the attribute of patient comfort, guidance toward the next preferred embodiment can be based simply asking a human subject lie in the chair with their jaw and verbally evaluate their comfort as a function of time.

A practical application of the God-Speed which has value within the technological arts is dental treatment. Further, all the disclosed embodiments of the God-Speed are useful in conjunction with dental treatments such as are used for the purpose of root canals, or for the purpose of restoration, or the like. There are virtually innumerable uses for the God-Speed described herein, all of which need not be detailed here.

The invention described herein provides substantially improved results that are unexpected. The invention described herein can be practiced without undue experimentation. The entirety of everything cited above or below is hereby expressly incorporated by reference.

Although the best mode contemplated by the inventor of carrying out the invention is disclosed above, practice of the invention is not limited thereto. It will be manifest that various additions, modifications and rearrangements of the features of the God-Speed may be made without deviating from the spirit and scope of the underlying inventive concept.

For example, hygiene could be enhanced by providing a disposable paper cover on the headrest. Further, efficiency could be enhance by providing a tray for holding dental implements or catching saliva on the back of the reclinable back. Furthermore, patient comfort could be enhanced by providing audio and/or video components in the headrest.

Similarly, although vinyl is preferred for the headrest cover, any suitable material could be used in its place. In addition, the individual components need not be fabricated from the disclosed materials, but could be fabricated from virtually any suitable materials.

Moreover, the individual components need not be formed in the disclosed shapes, or assembled in the disclosed configuration, but could be provided in virtually any shape, and assembled in virtually any configuration, which support the head of a dental patient so as to facilitate treatment. Further, although the headrest and/or chair described herein is a physically separate module, it will be manifest that the headrest and/or chair may be integrated into the apparatus with which it is associated. Furthermore, all the disclosed features of each disclosed embodiment can be combined with, or substituted for, the disclosed features of every other disclosed embodiment except where such features are mutually exclusive.

It is intended that the appended claims cover all such additions, modifications and rearrangements. Expedient embodiments of the God-Speed are differentiated by the appended subclaims.

REFERENCES

1. The Art and Science of Operative Dentistry, 3rd ed., Mosby (Sturdevant et al., 1993).
2. Periodontal Instrumentation, 2nd ed., Appleton & Lange, (Pattison et al. 1992).
3. Goodman and Gilman's The Pharmacological Basis of Therapeutics, 8th ed., Pergamon Press (Alfred G. Gilman et al. eds., 1990).
4. Applied Pharmacology for the Dental Hygienist, 3rd ed., Mosby (Barbara S. Requa-Clark et al., 1995).
5. Van Nostrand's Scientific Encyclopedia, 8th ed., Van Nostrand Reinhold (Douglas M. Considine et al. eds., 1995).

What is claimed is:

1. An apparatus, comprising:

a pivotable chair including:

a reclinable back; and a headrest connected to said reclinable back, said headrest including:

a bracket for attaching said headrest to said reclinable back; and a pad connected to said bracket, said pad including an internal perimeter that defines a hole through which a prone patient's nose and mouth can protrude so that said prone patient's oral cavity can be reached from below said prone patient, wherein said internal perimeter includes:

a first section that varies substantially according to $$(x)^2+(y)^2=r^2;$$

a second section connected to said first section, said second section varying substantially according to y=mx+b;

a third section connected to said second section, said third section varying substantially according to $$(x)^2=-4c(y+k);\text{ and}$$

a fourth section connected to said third section, said fourth section varying substantially according to y=−m(x−h)+b, wherein said first section is located at the center of a bottom circular portion of the perimeter of the hole that surrounds the junction between the jowl and the neck of said patient, said third section is located at a vertex of an upper parabolic section of the perimeter of the hole that surrounds the bridge of the nose of said prone patient and r>c.

2. The apparatus of claim 1, wherein said pivotable chair includes a base portion connected to said reclinable back and an elevating mechanism connected to said base portion.

3. The apparatus of claim 1, wherein said pivotable chair includes a base portion connected to said reclinable back and a leg rest connected to said base portion, said leg rest being pivotable with respect to said base portion.

4. The apparatus of claim 1, wherein said pivotable chair includes a first armrest connected to said reclinable back and a second armrest connected to said reclinable back, said first armrest and said second armrest both being attached to said reclinable back with a hinge pin so as to swing from a chair configuration, through a bed configuration, to a below-point-blank configuration wherein a patient's arms are supported in a position that is below a plane of the pivotable chair when the pivotable chair is in the bed configuration.

5. A method of treating a dental patient, comprising utilizing the apparatus of claim 1.

6. An apparatus, comprising:

a pivotable chair including:

a reclinable back; and a headrest connected to said reclinable back, said headrest including:

a bracket for attaching said headrest to said reclinable back; and a C-shaped pad connected to said bracket, said pad including an internal perimeter that defines a hole through which a prone patient's nose and mouth can protrude so that said prone patient's oral cavity can be reached from below said prone patient, wherein said internal perimeter includes:

a first section that varies substantially according to $$(x)^2+(y)^2=r^2;$$

a second section connected to said first section, said second section varying substantially according to $$(x)^2+(y+k)^2=(r')^2;$$

a third section connected to said second section, said third section varying substantially according to y=b;

a fourth section connected to said third section, said fourth section varying substantially according to $$(x+h)^2+(y+k)^2=(r'')^2;\text{ and}$$

a fifth section connected to said fourth section, said fifth section varying substantially according to $$(x+h)^2+(y)^2=(r''')^2,$$

wherein said first section, said second section, said third section, said fourth section and said fifth section of said pad roughly conform to the shape of the forehead and cheeks of said prone patient.

7. A method of treating a dental patient, comprising utilizing the apparatus of claim 6.

8. The apparatus of claim 6, wherein said pivotable chair includes a base portion connected to said reclinable back and an elevating mechanism connected to said base portion.

9. The apparatus of claim 6, wherein said pivotable chair includes a base portion connected to said reclinable back and a leg rest connected to said base portion, said leg rest being pivotable with respect to said base portion.

10. The apparatus of claim 6, wherein said pivotable chair includes a first armrest connected to said reclinable back and a second armrest connected to said reclinable back, said first armrest and said second armrest both being attached to said reclinable back with a hinge pin so as to swing from a chair configuration, through a bed configuration, to a below-point-blank configuration wherein a patient's arms are supported in a position that is below a plane of the pivotable chair when the pivotable chair is in the bed configuration.

11. An apparatus, comprising:

a pivotable chair including:

a reclinable back; and a headrest connected to said reclinable back, said headrest including:

a bracket for attaching said headrest to said reclinable back; and a pad connected to said bracket, said pad including an internal perimeter that defines a hole through which a prone patient's nose and mouth can protrude so that said prone patient's oral cavity can be reached from below said prone patient, wherein said internal perimeter includes:

a first section that varies substantially according to $$(x)^2+(y)^2=(r')^2;$$

a second section connected to said first section, said second section varying substantially according to y=mx+b;

a third section connected to said second section, said third section varying substantially according to $$(x-h)^2+(y-k)^2=(r'')^2;$$

a fourth section connected to said third section, said fourth section varying substantially according to y=b';

a fifth section connected to said fourth section, said fifth section varying substantially according to $$(x+h)^2+(y-k)^2=(r''')^2; \text{ and}$$

a sixth section connected to said fifth section, said sixth section varying substantially according to y=−m(x−h)+b, wherein the location of the first section is near an upper narrow portion of the hole in the headrest that surrounds the bridge of the nose and abuts against the forehead of said prone patient and the locations of the second section and the third section are near a lower wider portion of the hole in the headrest which surrounds the jaw and may abut against the jowls of said prone patient.

12. The apparatus of claim 11, wherein said pivotable chair includes a base portion connected to said reclinable back and an elevating mechanism connected to said base portion.

13. The apparatus of claim 11, wherein said pivotable chair includes a base portion connected to said reclinable back and a leg rest connected to said base portion, said leg rest being pivotable with respect to said base portion.

14. The apparatus of claim 11, wherein said pivotable chair includes a first armrest connected to said reclinable back and a second armrest connected to said reclinable back, said first armrest and said second armrest both being attached to said reclinable back with a hinge pin so as to swing from a chair configuration, through a bed configuration, to a below-point-blank configuration wherein a patient's arms are supported in a position that is below a plane of the pivotable chair when the pivotable chair is in the bed configuration.

15. A method of treating a dental patient, comprising utilizing the apparatus of claim 11.

* * * * *